United States Patent
Hung et al.

(10) Patent No.: US 8,482,669 B2
(45) Date of Patent: Jul. 9, 2013

(54) COMPUTER WITH TV MODULE AND STARTUP METHOD

(75) Inventors: Liang-Mao Hung, New Taipei (TW); Chi-Fan Ho, New Taipei (TW); Teng-Sheng Yu, New Taipei (TW); Teng-Yu Tsai, New Taipei (TW); Peng-Zheng Yang, New Taipei (TW); Ting-Chieh Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 16 days.

(21) Appl. No.: 13/210,404

(22) Filed: Aug. 16, 2011

(65) Prior Publication Data

US 2012/0182475 A1    Jul. 19, 2012

(30) Foreign Application Priority Data

Jan. 18, 2011 (TW) ................... 100101734

(51) Int. Cl.
*H04N 7/00* (2011.01)
(52) U.S. Cl.
USPC ........................................ 348/552

(58) Field of Classification Search
USPC .... 348/552, 554, 725, 730, 838, 726; 386/46, 386/68, 82, 93, 124, 126
See application file for complete search history.

(56) References Cited

U.S. PATENT DOCUMENTS

| | | | | |
|---|---|---|---|---|
| 5,790,201 A * | 8/1998 | Antos | ............ | 348/552 |
| 6,100,936 A * | 8/2000 | Jordan et al. | ................. | 348/552 |
| 7,042,515 B2 * | 5/2006 | Sung | ............. | 348/552 |
| 7,317,495 B2 * | 1/2008 | Takahashi | ..................... | 348/838 |
| 7,884,885 B2 * | 2/2011 | Su et al. | ......................... | 348/730 |
| RE43,394 E * | 5/2012 | Yu | ................... | 725/80 |
| 2004/0252246 A1 * | 12/2004 | Lee | ................. | 348/725 |
| 2007/0083775 A1 * | 4/2007 | Seon | ............................ | 713/300 |
| 2010/0067265 A1 * | 3/2010 | Lu et al. | ......................... | 363/49 |
| 2010/0082230 A1 * | 4/2010 | Hong et al. | .................. | 701/201 |
| 2011/0197085 A1 * | 8/2011 | Wu | ............................. | 713/323 |

FOREIGN PATENT DOCUMENTS
CN            201118795        * 9/2008

* cited by examiner

*Primary Examiner* — Paulos M Natnael
(74) *Attorney, Agent, or Firm* — Altis Law Group, Inc.

(57) ABSTRACT

A computer includes a switch, a power supply, a TV module, a computer module and a control module. The switch creates a trigger signal. The TV module plays TV programs. The control module controls the power supply to power on the TV module after receiving the trigger signal when the control module determines the TV module and the computer module are powered off.

8 Claims, 2 Drawing Sheets

COMPUTER WITH TV MODULE AND STARTUP METHOD

BACKGROUND

1. Technical Field

The present disclosure relates to computers, and particularly to, a computer with a TV module and a startup method thereof.

2. Description of Related Art

Computers with television (TV) modules are becoming more popular. People can watch TV via the computers. However, the TV module is activated after the computer system is working, which wastes power when people just want to watch TV.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or Assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
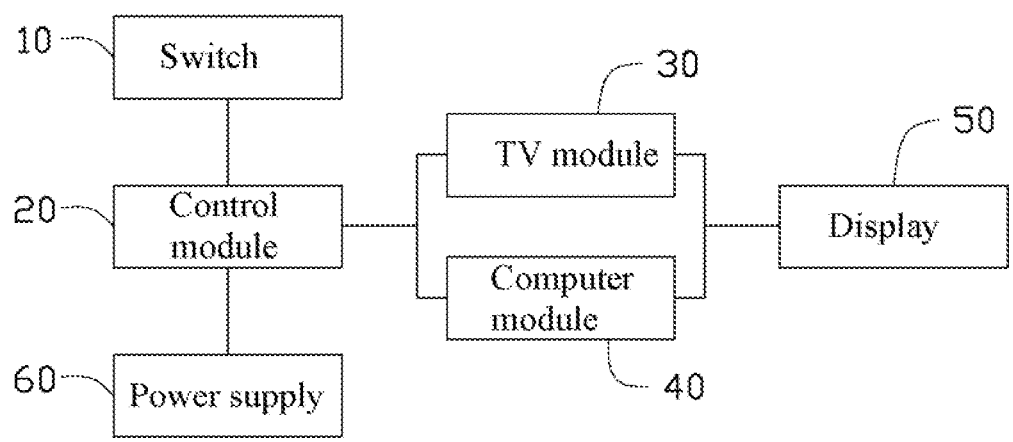
FIG. 1 is a block diagram of an embodiment of the computer.

Referring to FIG. 1, a computer includes a switch 10, a control module 20, a TV module 30, a computer module 40, a display 50, and a power supply 60.

The switch 10 is connected to the control module 20. The control module 20 is connected to the power supply 60. The TV module 30 and the computer module 40 are connected to the control module 20. The display 50 is connected to the TV module 30 and the computer module 40.

The switch 10 creates a trigger signal. The control module 20 supplies power to the TV module 30 or the computer module 40 after receiving the trigger signal. The display 50 displays visible data corresponding to the TV module 30 or the computer module 40 when the TV module 30 or the computer module 40 is working. The TV module plays TV programs.

Figure 2:
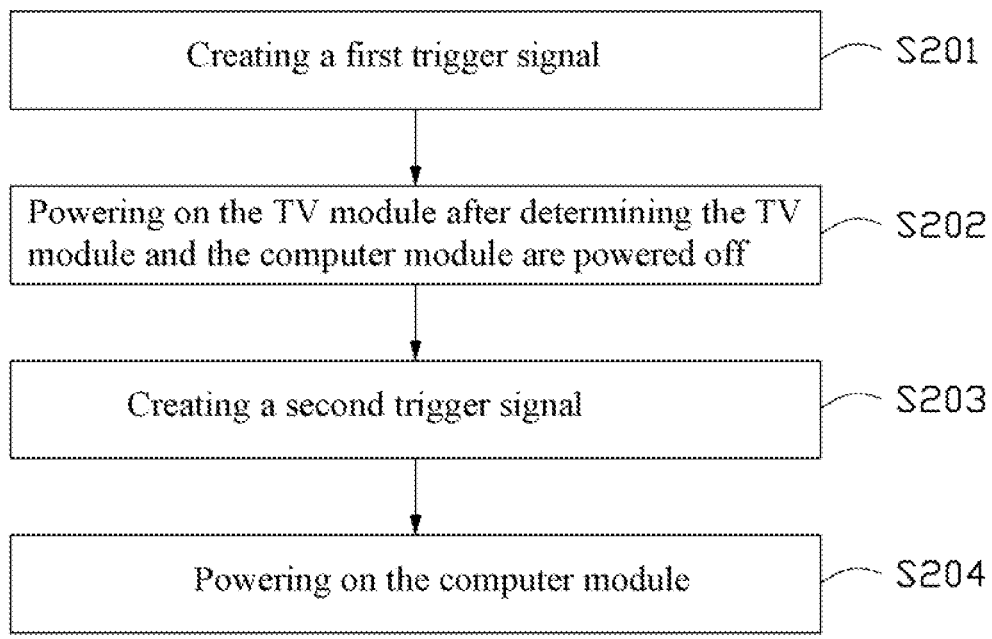
FIG. 2 is a flow chart in accordance with an embodiment of a startup method.

Referring to FIGS. 1 and 2, a startup method is shown. An embodiment of the method is as follows.

In step S201, the switch 10 creates a first trigger signal.

In step S202, the control module 20 determines if the TV module 30 and the computer module 40 are powered on. If the TV module 30 and the computer module 40 are powered off, the control module 20 controls the power supply 60 to power on the TV module 30 and loads TV kernel module data and TV system service data corresponding to the TV module 30.

In step S203, the switch 10 creates a second trigger signal.

In step S204, the control module 20 controls the power supply 60 to power off the TV module and power on the computer module 40, and loads computer kernel module data and computer system service data. When the switch 10 is pressed to create a third trigger signal. The control module 20 displays a notice to not load data on the display 50 if the computer kernel module data and the computer system service data is not loaded. The control module 20 displays a notice not to finish loading data on the display 50 if the computer kernel module data and the computer system service data is not finished loading.

In the above method, the control module 20 controls the power supply 60 to power off the computer module 40 after receiving the first trigger signal if the TV module 30 is powered off and the computer module 40 is powered on.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

Depending on the embodiment, certain of the steps of a method(s) described may be removed, others may be added, and the sequence of steps may be altered. It is also to be understood that the description and the claims drawn for a method may include some indication in reference to certain steps. However, the indication used is only to be viewed for identification purposes and not as a suggestion as to an order for the steps.

What is claimed is:

1. A computer comprising:
   a switch, the switch adapted to create a trigger signal;
   a power supply;
   a TV module, the TV module adapted to play TV programs;
   a computer module; and
   a control module, the control module adapted to control the power supply to only power on the TV module after receiving the trigger signal and determining that the TV module and the computer module are powered off;
   wherein the control module is adapted to control the power supply to power on the computer module and power off the TV module when the control module determines the TV module is powered on and the computer module is powered off.

2. The computer of claim 1, wherein the control module is adapted to control the power supply to power off the computer when the control module determines the TV module is powered off and the computer module is powered on.

3. The computer of claim 1, further comprising a display, wherein the display is adapted to display visible data corresponding to the TV module or the computer module.

4. The computer of claim 1, wherein the control module is adapted to load TV kernel module data and TV system service data corresponding to the TV module when the TV module is powered on via the trigger signal.

5. A startup method, applied in a computer, the method comprising:

provides a switch, a power supply, a control module, a TV module and a computer module;

controlling the power supply by the control module to power on the TV module after receiving a trigger signal created by the switch when the control module determines the TV module and the computer module are powered off; and controlling the power supply to power off the computer when the control module determines the TV module is powered off and the computer module is powered on.

6. The startup method of claim 5, wherein the controlling the power supply further comprises powering on the computer module and powering off the TV module when the control module determines the TV module is powered on and the computer module is powered off.

7. The startup method of claim 5, further comprising providing a display, and displaying visible data corresponding to the TV module or the computer module on the display.

8. The startup method of claim 5, further comprising loading TV kernel module data and TV system service data corresponding to the TV module after the TV module is powered on.

* * * * *